(12) United States Patent
Ingale et al.

(10) Patent No.: US 12,185,309 B2
(45) Date of Patent: Dec. 31, 2024

(54) METHOD AND APPARATUS FOR HANDLING SI IN WIRELESS COMMUNICATION SYSTEM

(71) Applicant: Samsung Electronics Co., Ltd., Suwon-si (KR)

(72) Inventors: Mangesh Abhimanyu Ingale, Bangalore (IN); Anil Agiwal, Suwon-si (KR); Soenghun Kim, Suwon-si (KR); Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 17/248,553

(22) Filed: Jan. 28, 2021

(65) Prior Publication Data

US 2021/0235475 A1 Jul. 29, 2021

(30) Foreign Application Priority Data

Jan. 29, 2020 (IN) .............................. 202041004029
Aug. 11, 2020 (IN) ............................ 2020 41004029

(51) Int. Cl.
*H04W 72/50* (2023.01)
*H04W 72/0453* (2023.01)
(Continued)

(52) U.S. Cl.
CPC ... *H04W 72/1273* (2013.01); *H04W 72/0453* (2013.01); *H04W 72/535* (2023.01); *H04W 76/27* (2018.02)

(58) Field of Classification Search
None
See application file for complete search history.

(56) References Cited

U.S. PATENT DOCUMENTS 10,531,496 B2   1/2020   Agiwal et al.
2011/0117912 A1*  5/2011   Mahajan ............... H04W 48/12
                                                                 455/434

(Continued)

FOREIGN PATENT DOCUMENTS

WO      2019/031913 A1    2/2019
WO   WO-2021054883 A1 *   3/2021  ............ G01S 19/04
(Continued)

OTHER PUBLICATIONS

Shih—U.S. Appl. No. 62/909,953—Oct. 13, 2019 (Year: 2019).*
(Continued)

*Primary Examiner* — The Hy Nguyen

(57) ABSTRACT

A communication method and system for converging a $5^{th}$-Generation (5G) communication system for supporting higher data rates beyond a $4^{th}$-Generation (4G) system with a technology for Internet of Things is disclosed. The method includes deciding that the UE requires at least one SIB from a plurality of SIBs indicated in a SI scheduling information broadcasted by a network. The method includes determining, from the plurality of SIBs, that the UE does not have a stored SIB as required or a stored version of a required SIB exists but the stored version of the required SIB is not valid. The method includes checking that the UE is allowed to send a SI request based on a network configuration. The method includes sending the SI request for the required SIB in response to checking that the UE is allowed to send the SI request based on the network configuration.

10 Claims, 6 Drawing Sheets

(51) Int. Cl.
*H04W 72/1273* (2023.01)
*H04W 76/27* (2018.01)

(56) References Cited

U.S. PATENT DOCUMENTS

| | | | |
|---|---|---|---|
| 2018/0132166 A1 | 5/2018 | Ishii | |
| 2019/0053029 A1* | 2/2019 | Agiwal | H04W 4/90 |
| 2019/0158988 A1* | 5/2019 | Lee | H04W 76/27 |
| 2019/0215858 A1 | 7/2019 | Ishii | |
| 2019/0268830 A1* | 8/2019 | Kim | H04W 36/0077 |
| 2019/0289661 A1* | 9/2019 | Chen | H04W 74/0866 |
| 2019/0306853 A1* | 10/2019 | Ishii | H04W 48/14 |
| 2020/0146100 A1* | 5/2020 | Lee | H04W 76/50 |
| 2021/0105852 A1* | 4/2021 | Shih | H04W 72/231 |
| 2021/0306869 A1* | 9/2021 | Wei | H04W 48/10 |
| 2022/0279425 A1* | 9/2022 | Shreevastav | H04W 76/20 |
| 2022/0377649 A1* | 11/2022 | Choi | H04W 48/12 |

FOREIGN PATENT DOCUMENTS

| | | | | |
|---|---|---|---|---|
| WO | WO-2021094843 A1 * | 5/2021 | | H04W 48/12 |
| WO | WO-2021225314 A1 * | 11/2021 | | |

OTHER PUBLICATIONS

Bergqvist—U.S. Appl. No. 62/900,902—Sep. 16, 2019 (Year: 2019).*

ETSI TS 138 331 V15.5.1 (May 2019)—5G; NR; Radio Resource Control (RRC); Protocol specification (Year: 2019).*

Examination report dated Nov. 15, 2021, in connection with Indian Application No. 202041004029, 6 pages.

International Search Report of the International Searching Authority in connection with International Application No. PCT/KR2021/001145 issued Apr. 21, 2021, 3 pages.

Mediatek Inc. et al., "On-demand system information and dedicated signalling", R2-1915780, 3GPP TSG-RAN WG2 Meeting #108, Reno, Nevada, USA, Nov. 18-22, 2019, 8 pages.

Qualcomm Inc., "Remaining details on broadcast assistance data delivery", R2-1915562, 3GPP TSG-RAN WG2 Meeting #108, Reno, Nevada, USA, Nov. 18-22, 2019, 5 pages.

Huawei et al., "Discussion on broadcasting of positioning assistance data", R2-1914981 (Resubmission of R2-1913038), 3GPP TSG-RAN WG2 Meeting #108, Reno, USA, Nov. 18-22, 2019, 4 pages.

CATT, "Broadcast Positioning Procedure in Connected Mode", R2-1914469, 3GPP TSG-RAN WG2 Meeting #108, Reno, Nevada, Nov. 18-22, 2019, 5 pages.

Huawei et al., "Further discussion on-demand SI for RRC_Connected UE", 3GPP TSG-RAN WG2 Meeting #108, Nov. 18-22, 2019, R2-1915597, 5 pages.

Supplementary European Search Report dated Dec. 9, 2022 in connection with European Patent Application No. 21 74 7656, 10 pages.

* cited by examiner

METHOD AND APPARATUS FOR HANDLING SI IN WIRELESS COMMUNICATION SYSTEM

CROSS-REFERENCE TO RELATED APPLICATIONS

This application is based on and claims priority under 35 U.S.C. § 119 to Indian Provisional Patent Application No. 202041004029, filed on Jan. 29, 2020, and Indian Non-Provisional Patent Application No. 202041004029, filed on Aug. 11, 2020 in the Indian Intellectual Property Office, the disclosure of which is incorporated by reference herein in its entirety.

BACKGROUND

1. Field

The present disclosure relates to a wireless communication system, more specifically related to a method and apparatus for transmitting and receiving system information.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

In the 3GPP Release 15 standards of the NR, the on-demand SI request is supported by the UE in an IDLE and an INACTIVE state. The Release 15 UE does not support the on-demand SI request in a CONNECTED state.

In one embodiment, a method performed by a user equipment (UE) in a wireless communication system, the method comprising: receiving, from a base station, scheduling information of system information (SI) associated with a plurality of system information blocks (SIBs); identifying that the UE requires at least one SIB from the plurality of SIBs indicated in the scheduling information; determining that the UE does not have a stored SIB as required or a stored version of the required SIB exists but the stored version of the required SIB is not valid; and transmitting, to the base station, a SI request for the required SIB.

In another embodiment, a user equipment (UE) in a wireless communication system, the UE comprising: a transceiver; and a processor configured to: receive, from a base station via the transceiver, scheduling information of system information (SI) associated with a plurality of system information blocks (SIBs), identify that the UE requires at least one SIB from the plurality of SIBs indicated in the scheduling information, determine that the UE does not have a stored SIB as required or a stored version of a required SIB exists but the stored version of the required SIB is not valid, and transmit, to the base station via the transceiver, a SI request for the required SIB.

The principal object of the embodiments herein is to provide a method for handling SI in a wireless communication system by a UE in a RRC connected mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
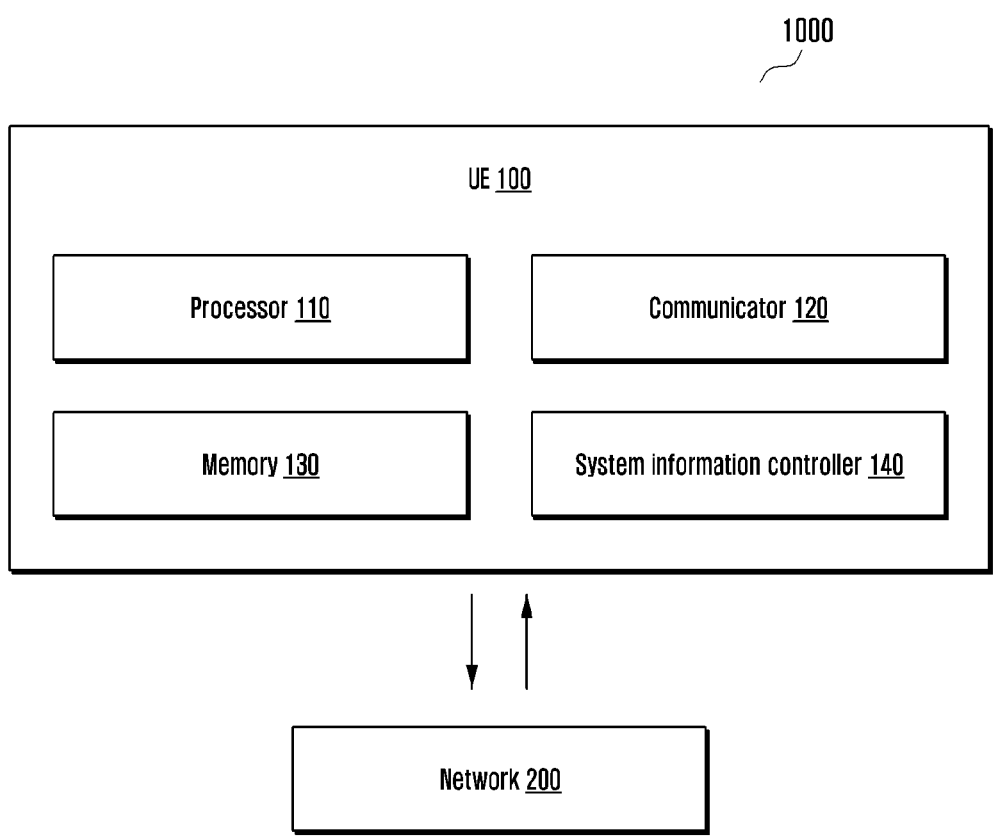
FIG. 1 is a block diagram illustrating a UE for handling SI in the wireless communication system, according to embodiments as disclosed herein.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In the recent years, several broadband wireless technologies have been developed to meet the growing number of broadband subscribers and to provide more and better applications and services. A second generation wireless communication system has been developed to provide voice services while ensuring the mobility of users. A third generation wireless communication system supports not only the voice service but also a data service. In recent years, a fourth generation wireless communication system has been developed to provide high-speed data service. However, currently, the fourth generation wireless communication system suffers from lack of resources to meet the growing demand for high speed data services, so that a fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100

GHz bands, so as to accomplish higher data rates. In order to mitigate propagation loss of radio waves and increase the transmission distance, a beamforming, massive multiple-input multiple-output (MIMO), Full dimensional MIMO (FD-MIMO), array antenna, an analog beamforming, large scale antenna techniques are being considered in the design of the fifth generation wireless communication system. In addition, the fifth generation wireless communication system is expected to address different use cases having quite different requirements in terms of data rate, latency, reliability, mobility, etc. However, a design of an air-interface of the fifth generation wireless communication system would be flexible enough to serve user equipments (UEs) having quite different capabilities depending on the use case and market segment the UE cater service to the end customer. For example, use cases the fifth generation wireless communication system wireless system are expected to address is enhanced mobile broadband (eMBB), massive machine type communication (m-MTC), ultra-reliable low latency communication (URLL), etc. The eMBB requirements like tens of Gbps data rate, low latency, high mobility and so on and so forth address the market segment representing the conventional wireless broadband subscribers needing internet connectivity everywhere, all the time and on the go. The m-MTC requirements like very high connection density, infrequent data transmission, very long battery life, low mobility and so on and so forth address the market segment representing the internet of things (IoT)/internet of everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

In the fourth generation wireless communication system like long term evolution (LTE), enhanced node B (eNB) or a base station broadcasts system information in a cell. The system information is structured into a master information block (MIB) and a set of system information blocks (SIBs). The MIB consists of system frame number (SFN), Downlink System bandwidth, and physical hybrid automatic repeat request (ARQ) feedback indicator channel (PHICH) configuration. The MIB is transmitted every 40 ms. The MIB is repeated every 10 ms wherein a first transmission occurs in sub frame #0 when the SFN mod 4 equals zero. The MIB is transmitted on a physical broadcast channel (PBCH). system information block type 1 (SIB1) carries cell identity, tracking area code, cell barring information, value tag (common for all scheduling units), and scheduling information of other SIBs. The SIB1 is transmitted every 80 ms in subframe #5 when the SFN mod 8 equals zero. The SIB1 is repeated in subframe #5 when the SFN mod 2 equals zero. The SIB1 is transmitted on the physical downlink shared channel (PDSCH). Other SIBs (SIB 2 to SIB 21) are transmitted in a SI message, wherein the scheduling information of the SIBs are indicated in the SIB1. Further, in the LTE system during a handover of a UE from a source eNB to a target eNB, the target eNB provides through the dedicated signaling the specific subsets of parameters of the MIB, SIB1, and SIB2 of the target cell in the handover command message to the UE. The RACH configuration and physical configuration of the target cell i.e., radioResourceConfigCommon is provided to the UE in the mobilitycontrolinfo through dedicated signaling. Similarly, if the UE is operating in a dual connectivity mode of an operation then the system information of the cells of the secondary eNB (SeNB) or secondary cell group (SCG) cells i.e., the RACH configuration and physical configuration of the SCG cells, i.e., radioResourceConfigCommonPSCell is provided to the UE through a dedicated signaling. Another scenario where the UE is provided the dedicated system information is upon release with redirection wherein the SI of candidate cells i.e., system information in the CellInforGERAN and utra-BCCH-Container in the CellInfoUTRA for GSM edge radio access network (GERAN) and universal mobile telecommunications system (UMTS) respectively are provided to the UE in an RRC-ConnectionRelease message.

For the fifth generation wireless communication system i.e., NR system, in a 5G node B (i.e., gNB), the system information is delivered either through broadcast or delivered upon a UE request i.e., on-demand SI request. In the fifth generation wireless communication system, information is divided into minimum SI (MSI) and other SI (OSI). Similar to LTE system information the other SI can be structured into a set of SI-blocks (SIBs).

The MSI is periodically broadcasted. Other SI can be periodically broadcasted or provided on-demand based on a UE request. The minimum SI comprises basic information required for initial access to a cell and information for acquiring any other SI broadcast periodically or provisioned via the on-demand basis. The minimum SI includes at least SFN, list of public land mobile network (PLMN), cell ID, cell camping parameters, RACH parameters. If the network allows on a demand mechanism, parameters required for requesting other SI-block(s) (if any needed, e.g., RACH preambles for request) are also included in the MSI. The MSI comprises of at least the MIB and SIB1 which covers the parameters similar to LTE MIB, SIB1, and SIB2.

The scheduling information in the MSI includes an indicator which indicates whether the concerned SI-block is periodically broadcasted or provided on the demand. The scheduling information for the other SI includes SIB type, validity information, SI periodicity, and SI-window information. The scheduling information for the other SI is provided irrespective of whether the other SI is periodically broadcasted or not. If minimum SI indicates that the SIB is not broadcasted (i.e., the SIB is provided on demand), then the UE does not assume that this SIB is a periodically broadcasted in its SI-window at every SI period. Therefore, the UE may send an SI request to receive the SIB. For other SI provided on-demand, the UE can request one or more SI-block(s) or all SI-blocks in a single request.

The NR system can be deployed in standalone (SA) mode of operation (i.e., UE only connected to the NR) or a non-standalone mode of operation i.e., UE connected to both LTE and NR alike LTE dual connectivity, meaning the radio connection involves a master cell group controlled by a master node and a secondary cell group controlled by a secondary node). In the standalone mode of operation, the MSI is always periodically broadcasted while the OSI can be provided on-demand basis or periodically broadcasted depending on network (or a base station) implementation. For non-standalone mode of operation where the LTE eNB is a master node and the NR gNB is a secondary node, the system information of the cells of the secondary node or NR SCG cells involves dedicated transfer of SI upon SCG cell addition or during the SCG change. In such scenario the network pushes the relevant SI of the NR SCG cells because the on-demand concept for requesting the relevant SI is not supported for the non-standalone mode of operation. In the 3GPP Release 15 standards of the NR, the on-demand SI request is supported by the UE in an IDLE and an INAC- TIVE state. The Release 15 UE does not support the on-demand SI request in a CONNECTED state.

There are a few UE requirements for storing the acquired SI regardless of the mode of operation is the standalone or the non-standalone. The UE shall store relevant SI acquired from the currently camped/serving cell. Storing SI other than the currently camped/serving cell is up to UE implementation. The UE may store several versions of SI based on its storage capability. The UE may indicate its storage capability to the network. Different from LTE, some NR SI acquired from/provided by dedicated signaling for one cell may be valid in another cell also i.e., the information may be valid in an area covered by multiple cells. Like in LTE, a version of the SI that the UE acquires and stores remains valid only for a certain time. The UE may use such a stored version of the SI, e.g., after cell re-selection, upon return from out of coverage, after SI change indication or after SCG change. In typical UE implementation the SI storage management is typically referred as garbage collection wherein the stored information for the longest time is typically discarded. Stored SI normally does not change during the RRC connection unless garbage collection is invoked upon reception of new SI or validity timer associated with stored SI has expired or so called systeminfovaluetag or systemconfigurationindex associated with stored SI has changed.

In the NR system, the network (or a base station) should be able to provide SI required in the connected state upon the same UE mobility cases as in LTE (change of PCell, SCell addition). In addition, it may be beneficial for the network to provide the connected state UE with SI required if the UE active bandwidth part (BWP) is not configured with common search space as shown in the [Table 1].

TABLE 1

| Case | Items required | Notes |
| --- | --- | --- |
| UE mobility in connected Change of PCell, addition/ change of SCells | Parameters from MSI) MIB and SIB1 | Concerns both for SIBs that may be provided on-demand and broadcast only SIBs |
| UE in connected with active BWP not configured with common search space | Parameters from MSI) MIB and SIB1 | Concerns both for SIBs that may be provided on-demand and broadcast only SIBs |

In case only essential parts of MSI are provided (some parameters of MIB and SIB1), during PCell mobility i.e., handover, the UE may subsequently obtain the missing parts by reading the MIB and SIB1 from the broadcast (if the UE is configured with the common search space) after the handover is completed. If the UE active BWP is not configured with common search space, then the UE is preferable to always transfer entire MIB (except SFN) and SIB1 to UE in a dedicated manner. This furthermore avoids the tedious efforts to determine the essential fields (fields urgently required upon UE mobility). The NR system has introduced support of dedicated transfer of SI to the reconfiguration message. SI may be provided in the same message commanding UE mobility i.e., to the NR reconfiguration message like the handover command message in LTE. For a UE in RRC_CONNECTED, the network can provide system information through dedicated signaling using the RRCReconfiguration message, e.g., if the UE has an active BWP with no common search space configured to monitor system information or paging. The entire SIB1 can be provided by the network to the UE through dedicated signaling using the field dedicatedSIB1-Delivery included in the RRCReconfiguration message. Any other SIB can be provided by the network to the UE through dedicated signaling using the field dedicatedSystemInformationDelivery included in the RRCReconfiguration message. In the Release16 of NR standardization, new features like vehicle to everything (V2X), positioning are introduced, and hence new SIBs associated with these features will be introduced. These new SIBs will be required by the UE in an RRC_CONNECTED state. Therefore, the on-demand concept of the SI request is also supported by UE in the RRC_CONNECTED state in Release-16. In the patent disclosure, the following aspects related to support of the SI request by the UE in RRC_CONNECTED state is disclosed:

1. If the UE's active BWP is not configured with common search space then, the UE shall send SI request in an RRC_CONNECTED state for the desired SIB by only checking schedulinginfo in stored SIB1.
2. If common search space is configured for the UE's active BWP, and if a SIB is required in RRC_CONNECTED state anytime during modification period N then, the UE checks schedulinginfo in stored SIB1 acquired at the beginning of modification N to determine whether the UE can trigger the SI request
3. If common search space is configured for the UE's active BWP, and if a SIB is required in RRC_CONNECTED state anytime during modification period N+1, then the UE is allowed to re-acquire SIB1 if the stored SIB1 is acquired at the beginning of modification N or earlier.
4. The UE behavior is defined for the UE to trigger the SI request in RRC_CONNECTED state based on the setting of the si-broadcaststatus bit in SIB1 and the status of the FLAG i.e., ondemandSibRequest sent in the RRCReconfiguration message.

Accordingly, embodiments herein disclose a method for handling SI in a wireless communication system by a UE in a RRC connected mode. The method includes deciding, by the UE, that the UE requires at least one SIB from a plurality of SIBs indicated in a SI scheduling information broadcasted by a network. The method includes determining, by the UE, from the plurality of SIBs, that the UE does not have a stored SIB as required or a stored version of a required SIB exists but the stored version of the required SIB is not valid. Further, the method includes checking, by the UE, that the UE is allowed to send a SI request based on a network configuration. Further, the method includes sending, by the UE, the SI request for the required SIB in response to checking that the UE is allowed to send the SI request based on the network configuration.

In an embodiment, deciding, by the UE, that the UE requires the at least one SIB from the plurality of SIB s indicated in the scheduling information broadcasted by the network includes determining, by the UE, that an active BWP with a common search space is configured for the UE, detecting, by the UE, that a SIB1 is not acquired in a current modification period, and acquiring, by the UE, the SIB1 from the broadcast in response to detecting that the SIB1 is not acquired in the current modification period.

In an embodiment, acquiring the SIB1 from the broadcast includes storing, by the UE, the acquired SIB1 from the broadcast, and checking, by the UE, the SI scheduling information in the stored SIB1 and to determine a setting of a si-BroadcastStatus bit associated with the required SIB.

In an embodiment, acquiring the required SIB from the broadcast in response to determining that the active BWP with the common search space is configured for the UE includes acquiring, by the UE, the required SIB from the broadcast if, in the stored SIB1, the si-BroadcastStatus bit associated with the required SIB is set to Broadcasting status.

In an embodiment, sending, by the UE, the SI request for the required SIB includes determining, by the UE, that an active BWP with a common search space is configured for the UE, checking, by the UE, the SI scheduling information in a stored SIB1 and to determine a setting of a si-BroadcastStatus bit associated with the required SIB, and sending, by the UE, the SI request indicating the required SIB if, in the stored SIB1, the si-BroadcastStatus bit associated with the required SIB is set to NotBroadcasting status and the UE is allowed to send SI request based on the network configuration.

In an embodiment, sending, by the UE, the SI request for the required SIB includes determining, by the UE, that an active BWP without a common search space is configured for the UE, checking, by the UE, the SI scheduling information in a stored SIB1, and sending, by the UE, the SI request indicating the required SIB if the UE is allowed to send the SI request based on the network configuration.

In an embodiment, the network configuration is received, from the network, by receiving, by the UE, a RRC reconfiguration message from the network including an indication indicating one of: whether the UE is allowed to send the SI request in the RRC connected mode and whether the UE is not allowed to send the SI request in the RRC connected mode.

Accordingly, embodiments herein disclose a UE for handling SI in a wireless communication system including the UE in a RRC connected mode and a network. The UE includes a processor coupled with a memory. The processor is configured to decide that the UE requires at least one SIB from a plurality of SIBs indicated in a SI scheduling information broadcasted by a network. Further, the processor is configured to determine, from the plurality of SIBs, that the UE does not have a stored SIB as required or a stored version of a required SIB exists but the stored version of the required SIB is not valid. Further, the processor is configured to check that the UE is allowed to send a SI request based on a network configuration. Further, the processor is configured to send the SI request for the required SIB in response to checking that the UE is allowed to send the SI request based on the network configuration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein achieve a method for handling SI in a wireless communication system by a UE in a RRC connected mode. The method includes deciding, by the UE, that the UE requires at least one SIB from a plurality of SIBs indicated in a SI scheduling information broadcasted by a network. The method includes determining, by the UE, from the plurality of SIBs, that the UE does not have a stored SIB as required or a stored version of a required SIB exists but the stored version of the required SIB is not valid. Further, the method includes checking, by the UE, that the UE is allowed to send a SI request based on a network configuration. Further, the method includes sending, by the UE, the SI request for the required SIB in response to checking that the UE is allowed to send the SI request based on the network configuration.

Referring now to the drawings, and more particularly to FIGS. 1 through 6, where similar reference characters denote corresponding features consistently throughout the figures, there are shown preferred embodiments.

FIG. 1 shows various hardware components of a UE (100) for handling SI in the wireless communication system (1000), according to embodiments as disclosed herein. The wireless communication system (1000) includes the UE (100) and a network (200). The UE (100) can be, for example, but not limited to a cellular phone, a smart phone, a Personal Digital Assistant (PDA), a tablet computer, a laptop computer, an Internet of Things (IoT), a virtual reality device and an immersive system. The UE (100) includes a processor (110), a communicator (120), a memory (130), and a SI controller (140). The processor (110) is coupled with the communicator (120), the memory (130), and the SI controller (140).

The SI controller (140) is configured to decide that the UE (100) requires the at least one SIB from a plurality of SIBs indicated in a SI scheduling information broadcasted by the network (200). In an embodiment, the UE (100) requiring the at least one SIB from the plurality of SIBs indicated in the scheduling information broadcasted by the network (200) is decided by determining that an active BWP with a common search space is configured for the UE (100), detecting that a SIB1 is not acquired in a current modification period, and acquiring the SIB1 from the broadcast in response to detecting that the SIB1 is not acquired in the current modification period.

In an embodiment, the SIB1, is acquired from the broadcast, the acquired SIB1 from the broadcast is stored, and the SI scheduling information in the stored SIB1 is checked and a setting of a si-BroadcastStatus bit associated with the required SIB is determined. In an embodiment, acquiring the required SIB from the broadcast in response to determining that the active BWP with the common search space is configured for the UE (100) includes acquire the required SIB from the broadcast if, in the stored SIB1, the si-BroadcastStatus bit associated with the required SIB is set to Broadcasting status.

Further, the SI controller (140) is configured to determine, from the plurality of SIBs, that the UE (100) does not have a stored SIB as required or a stored version of a required SIB exists but the stored version of the required SIB is not valid. Further, the SI controller (140) is configured to check that the UE (100) is allowed to send a SI request based on a network configuration. The network configuration is received, from the network (200), by receiving a RRC reconfiguration message from the network (200) including an indication indicating one of: whether the UE (100) is allowed to send the SI request in the RRC connected mode and whether the UE (100) is not allowed to send the SI request in the RRC connected mode.

Further, the SI controller (140) is configured to send the SI request for the required SIB in response to checking that the UE (100) is allowed to send the SI request based on the network configuration. In an embodiment, the SI request for the required SIB is sent by determining that the active BWP with the common search space is configured for the UE (100), checking the SI scheduling information in the stored SIB1 and determining a setting of a si-BroadcastStatus bit associated with the required SIB, and sending the SI request indicating the required SIB if, in the stored SIB1, the si-BroadcastStatus bit associated with the required SIB is set to NotBroadcasting status and the UE (100) is allowed to send SI request based on the network configuration. In another embodiment, the SI request for the required SIB is sent by determining that the active BWP without the common search space is configured for the UE (100), checking the SI scheduling information in the stored SIB1, and sending the SI request indicating the required SIB if the UE (100) is allowed to send the SI request based on the network configuration.

The processor (110) is configured to execute instructions stored in the memory (130) and to perform various processes. The communicator (120) is configured for communicating internally between internal hardware components and with external devices via one or more networks.

The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in random access memory (RAM) or cache).

Although the FIG. 1 shows various hardware components of the UE (100) but it is to be understood that other embodiments are not limited thereon. In other embodiments, the UE (100) may include less or more numbers of components. Further, the labels or names of the components are used only for illustrative purpose and does not limit the scope of the invention. One or more components can be combined together to perform same or substantially similar function to handle the SI in the wireless communication system (1000).

Figure 2:
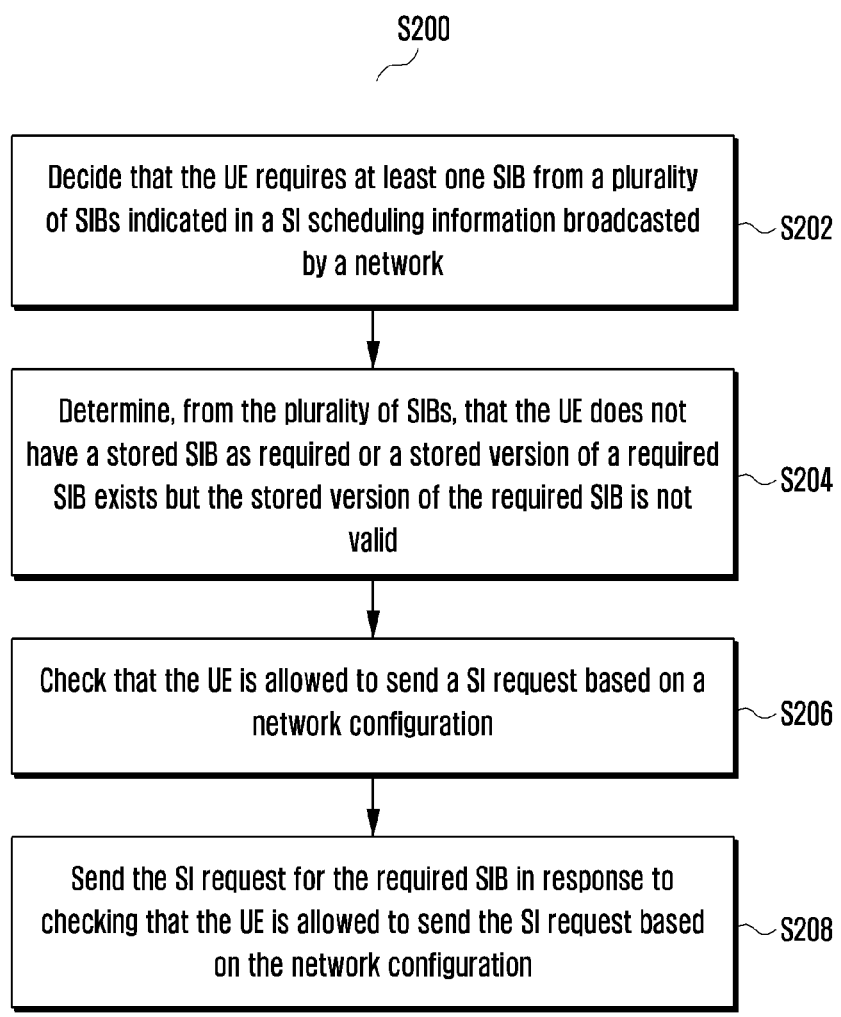
FIG. 2 is a flow chart illustrating a method for handling SI in the wireless communication system, according to embodiments as disclosed herein.

FIG. 2 is a flow chart (S200) illustrating a method for handling SI in a wireless communication system (1000), according to embodiments as disclosed herein. The operations (S202-S208) are performed by the processor (110).

At S202, the method includes deciding that the UE (100) requires the at least one SIB from the plurality of SIBs indicated in the SI scheduling information broadcasted by the network (200). At S204, the method includes determining, from the plurality of SIBs, that the UE (100) does not have the stored SIB as required or the stored version of the required SIB exists but the stored version of the required SIB is not valid. At S206, the method includes checking that the UE (100) is allowed to send the SI request based on the network configuration. At S208, the method includes sending the SI request for the required SIB in response to checking that the UE (100) is allowed to send the SI request based on the network configuration.

Method 1: SI request in the connected state based on only checking schedulingInfo The triggering for the SI request in the connected state shall be possible whenever the UE (100) wants to receive the SIB (e.g., positioning is activated, V2X is activated, etc.) which can happen any time. In the Release 15, a radio resource control (RRC) specification i.e., TS 38.331, the trigger for the SI request is determined while the UE (100) is performing SIB1 processing i.e., clause 5.2.2.4.2 titled as 'actions upon reception of the SIB1'. This works for determining the SI request when the UE (100) is in an idle/inactive state. However, when the UE (100) is in the connected state, the UE's active BWP may not be configured with the common search space, so that when the UE (100) decides to acquire the SIB (e.g., SIBx associated with V2X), the UE (100) cannot re-acquire the SIB1 from broadcast. Further, the UE (100) can be argued whether the gNB will always provide SIB1 in dedicated manner to the UE (100) whenever the gNB changes the broadcast status bit if the UE BWP is not configured with the common search space. The gNB will not do so if the rest of the SIB1 content is not updated and only the status of the broadcast bit is changed. In this case, the UE (100) shall be able to trigger the SI request procedure in clause 5.2.2.3.3 titled 'Request for on demand system information' in TS 38.331, without the need to re-acquire SIB1 and checking the contents of the field si-SchedulingInfo in the stored SIB1 ignoring the status of broadcast bit. The status of the broadcast bit does not matter because after receiving the SI request from the UE (100), the gNB cannot broadcast the requested SIB(s) since the active BWP is not configured with common search space. The gNB will deliver the requested SIB(s) in dedicated RRC signaling upon receiving the SI request from the UE (100). The following clause needs to be introduced in Release 16 version of RRC specification, to allow the UE (100) to send SI request without the need to re-acquire SIB1 and by checking the contents of the field si-SchedulingInfo in the stored SIB1, when the active BWP is not configured with common search space.

5.2.2.3.3x actions upon the need to acquire SIB in connected state

The UE (100) shall:

1> if the UE (100) is in the RRC_CONNECTED with the active BWP with the common search space not configured by searchSpaceSIB1 and pagingSearchSpace and the UE (100) has not stored a valid version of the SIB, in accordance with sub-clause 5.2.2.2.1, of one or several required SIB(s), in accordance with sub-clause 5.2.2.1.

2> for the SI message(s) that, according to the si-SchedulingInfo in the stored SIB1, contain at least one required SIB.

3> trigger a request to acquire the SI message(s) as defined in sub-clause 5.2.2.3.3.

Alternately, the UE (100) shall:

1> if the UE (100) is in the RRC_CONNECTED with the active BWP with the common search space not configured by searchSpaceSIB1 and pagingSearchSpace and the UE (100) has not stored a valid version of a SIB, in accordance with sub-clause 5.2.2.2.1, of one or several required SIB(s), in accordance with sub-clause 5.2.2.1.

2> for the required SIB(s) that, according to the si-SchedulingInfo in the stored SIB1, are mapped to SI message (s).

3> trigger a request to acquire the required SIB(s) as defined in sub-clause 5.2.2.3.3.

Alternately, the UE (100) shall:

1> if the UE (100) is in the RRC_CONNECTED with the active BWP with the common search space not configured by searchSpaceSIB1 and pagingSearchSpace and onDemandSibRequest is set to TRUE and the UE (100) has not stored the valid version of the SIB, in accordance with sub-clause 5.2.2.2.1, of one or several required SIB(s), in accordance with sub-clause 5.2.2.1.

2>for the SI message(s) that, according to the si-SchedulingInfo in the stored SIB1, contain at least one required SIB.
3>trigger a request to acquire the SI message(s) as defined in sub-clause 5.2.2.3.3.

OnDemandSibRequest indicator is included in the RRC Reconfiguration message and indicates that the UE (100) is allowed to send the SI request in connected state. In an embodiment, the OnDemandSibRequest indicator can be included in the SIB1.

If the onDemandSibRequest indicator included in the SIB1 indicates FALSE i.e., the UE (100) cannot send SI request in RRC_CONNECTED state, then the UE (100) acquires the SIB(s) required in the connected state in advance when the UE (100) is in the idle/inactive state.

If the onDemandSibRequest indicator included in RRCReconfiguration message indicates FALSE i.e., the UE (100) cannot send SI request in the RRC_CONNECTED state, then the UE (100) acquires the SIB(s) required in the CONNECTED state when the UE (100) transition to the idle/inactive regardless of the service is activated or not.

Figure 3:
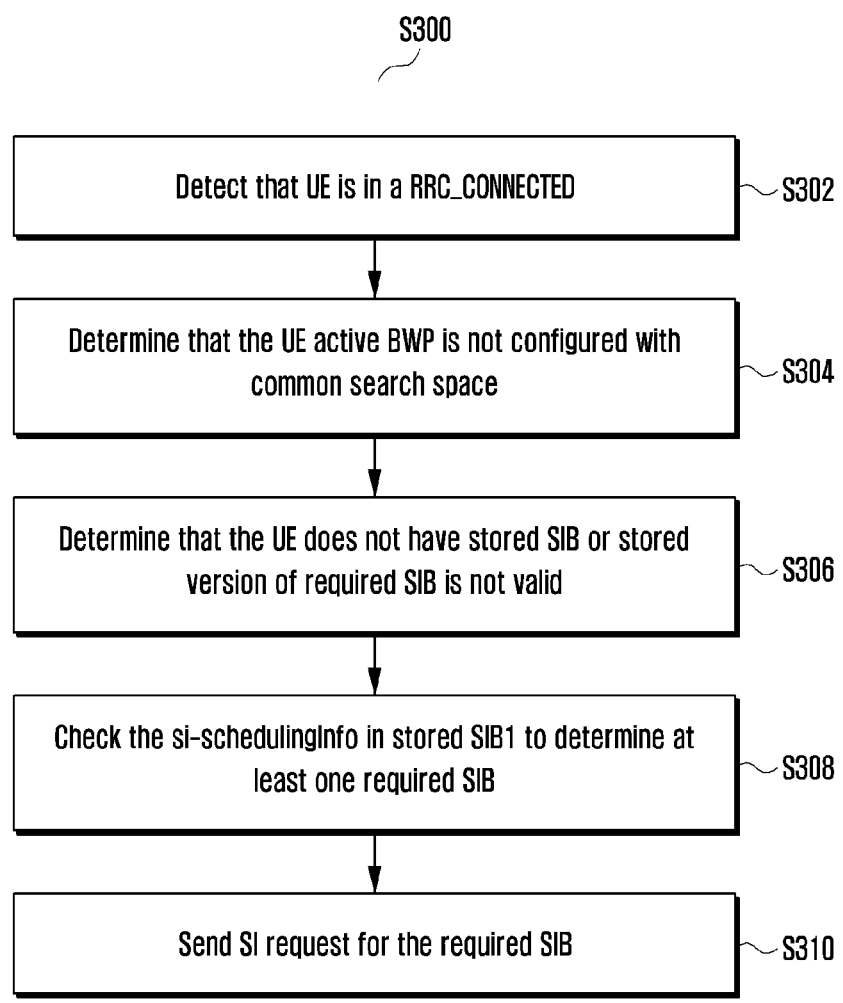
FIGS. 3 to 5 are example flow diagrams illustrating various operations for triggering for SI request in an RRC_CONNECTED, according to embodiments as disclosed herein.

The method can be used to trigger the SI request to acquire SIB in the RRC_CONNECTED state when the UE active BWP is not configured with common search space is depicted in the FIG. 3. In an example, as shown in the FIG. 3, at S302, the method includes detecting that the UE (100) is in the RRC_CONNECTED mode. At S304, the method includes determining that the UE active BWP is not configured with the common search space. At S306, the method includes determining that the UE (100) does not have stored SIB or stored version of required SIB is not valid. At S308, the method includes determining the si-schedulingInfo in stored SIM to determine at least one required SIB. At S310, the method includes sending the SI request for the required SIB.

Alternately, since the UE's active BWP is not configured with the common search space, the required SIB(s) cannot be broadcasted. The gNB provides the SIB(s) identified as required in the connected state and supported in the cell in dedicated signaling to the UE (100) in an unsolicited manner. If the unsolicited delivery of SIB(s) identified as required in connected state is supported by the network (200) (during UE (100) transition from idle/inactive to connected and PCell mobility) then there is no need for the UE (100) to make SI request in the RRC_CONNECTED state.

Method 2: SI request in the connected state based on checking schedulingInfo and status of broadcast bit In the Release 15, the RRC specification i.e., TS 38.331, the trigger for SI request is determined while the UE (100) is performing the SIM processing i.e., clause 5.2.2.4.2 titled as 'actions upon reception of the SIB1'. This works for determining the SI request when the UE (100) is in idle/inactive state and the connected state when the UE's active BWP is configured with the common search space, so that when UE (100) is processing the received SIB1, UE can decide to acquire the SIB (e.g., SIM associated with V2X), by executing clause 5.2.2.4.2.

For example, assume that at time instant t1 when the UE (100) acquired SIB1 (either broadcast or dedicated) the scheduling info included V2X SIB related info. Since the UE (100) was not interested in the V2X while executing clause 5.2.2.4.2 at time instant t1, the UE did not take any action. At time instant t1+T, the UE (100) is interested in the V2X service and the UE (100) requires the V2X SIB. If t1+T is within the modification period N in which the UE (100) has acquired SIB (i.e., t1 and t1+T corresponds to same modification period) then the stored SIB1 acquired at time instant t1 is still valid. The UE (100) can re-process the stored SIB1 acquired at time instant t1 to decide whether to trigger SI request. The triggering for SI request in the connected state shall be possible whenever the UE (100) wants to receive the SIB (e.g., positioning is activated, V2X is activated, etc.) which can happen any time during the modification N. However, according to Release-15 RRC specification, checking of si-schedulingInfo for triggering the SI request is performed when the SIB1 is acquired by the UE (100) while executing clause 5.2.2.4.2. So, there is a need to at least specify that before triggering SI request for required SIBs the UE (100) shall check the scheduling info in valid version of SIB1. In this case, the UE (100) shall be able to trigger SI request procedure in clause 5.2.2.3.3 titled 'Request for on demand system information' in TS 38.331, by checking the contents of the field si-SchedulingInfo and the status of broadcast bit in the stored valid version of SIB1. The following clause needs to be introduced in Release 16 version of RRC specification to allow the UE (100) to send SI request by checking the contents of the field si-SchedulingInfo in the stored valid version of SIB1 to determine if the SIB is supported in the cell.

5.2.2.3.3x Actions upon the need to acquire SIB in connected state

The UE (100) shall:
1>if the UE (100) is in the RRC_CONNECTED with the active BWP with common search space not configured by the searchSpaceSIB1 and pagingSearchSpace and the UE (100) has not stored the valid version of the SIB, in accordance with sub-clause 5.2.2.2.1, of one or several required SIB(s), in accordance with sub-clause 5.2.2.1:
2>for the SI message(s) that, according to the si-SchedulingInfo in the stored SIB1, contain at least one required SIB:
3>trigger a request to acquire the SI message(s) as defined in sub-clause 5.2.2.3.3:
1>else if the UE (100) is in the RRC_CONNECTED with the active BWP with the common search space configured by the searchSpaceSIB1 and pagingSearchSpace and the UE (100) has not stored a valid version of the SIB, in accordance with sub-clause 5.2.2.2.1, of one or several required SIB(s), in accordance with sub-clause 5.2.2.1:
2>for the SI message(s) that, according to the si-SchedulingInfo in the stored SIB1, contain at least one required SIB and for which si-BroadcastStatus is set to Broadcasting:
3>acquire the SI message(s) as defined in sub-clause 5.2.2.3.2;
2>for the SI message(s) that, according to the si-SchedulingInfo in the stored SIB1, contain at least one required SIB and for which si-BroadcastStatus is set to notBroadcasting:
3>trigger a request to acquire the SI message(s) as defined in sub-clause 5.2.2.3.3:

If the time instance t1+T, when the UE (100) want to acquire the SIB is within the modification period N i.e., (t1+T<N) then the stored SIB1 acquired at time instant t1 is still valid, else the UE (100) need to re-acquire SIB1 from broadcast.

In an embodiment, 5.2.2.3.3x Actions upon the need to acquire SIB in the connected state The UE (100) shall:
1>if the UE (100) is in the RRC_CONNECTED with the active BWP with the common search space not configured by the searchSpaceSIB1 and paging SearchSpace and onDemandSibRequest is set to TRUE and the UE (100) has not stored a valid version of the SIB, in accordance with sub-clause 5.2.2.2.1, of one or several required SIB(s), in accordance with sub-clause 5.2.2.1:

2>for the SI message(s) that, according to the si-SchedulingInfo in the stored SIB1, contain at least one required SIB:

3>trigger a request to acquire the SI message(s) as defined in sub-clause 5.2.2.3.3:

1>else if the UE (100) is in the RRC_CONNECTED with the active BWP with common search space configured by searchSpaceSIB1 and pagingSearchSpace and onDemandSibRequest is set to TRUE and the UE (100) has not stored the valid version of the SIB, in accordance with sub-clause 5.2.2.2.1, of one or several required SIB(s), in accordance with sub-clause 5.2.2.1:

2>for the SI message(s) that, according to the si-SchedulingInfo in the stored SIB1, contain at least one required SIB and for which si-BroadcastStatus is set to Broadcasting:

3>acquire the SI message(s) as defined in sub-clause 5.2.2.3.2;

2>for the SI message(s) that, according to the si-SchedulingInfo in the stored SIB1, contain at least one required SIB and for which si-BroadcastStatus is set to notBroadcasting:

3>trigger a request to acquire the SI message(s) as defined in sub-clause 5.2.2.3.3:

If time instance t1+T is not within the modification period (i.e., t1+T>N) in which SIB1 was acquired, then the stored SIB1 acquired at time instant t1 may not be valid to make the right decision for SI request. The UE (100) is required to re-acquire SIB1 from broadcast at this time instance t2. In general, the UE (100) applies the SI acquired or received previously and also when the SI has been updated. In other words, until the UE (100) manages to acquire the new SI, the UE (100) will continue using the previous version of SI (if valid). This general behavior is not appropriate for deciding SI request based on the broadcast bit status in SIB1. The reason why the stored SIB1 acquired at time instance t1 may not be valid is as follows:

According to Release-15 RRC specification, the UE (100) request the SI if required SIB is supported and broadcast status is set to not broadcasting. It can be argued whether the gNB will always provide the SIB1 in dedicated manner to the UE (100) whenever the eNB changes the broadcast status bit if the UE BWP is configured with common search space. The gNB will not do so if rest of the SIB1 content is not updated and only the status of the broadcast bit is changed, so that when common search space is configured in the active BWP, the UE (100) shall re-acquire SIB1 and check broadcast status bit. The field description of si-BroadcastStatus bit states:

Indicates if the SI message is being broadcasted or not. Change of si-BroadcastStatus should not result in system information change notifications in short message transmitted with P-RNTI over the downlink control information (DCI) (see clause 6.5). The value of the indication is valid until the end of the BCCH modification period when set to broadcasting.

This means the status can be changed from not broadcasting to broadcasting anytime within the modification period. If the status is changed to broadcasting, then the network (200) starts broadcasting the concerned SIB. However, this change in status of the broadcast bit does not result in SI change notification and hence there is no trigger for the UE (100) to re-acquire SIB1. If some UE (100) which had acquired SIB1 at time instance t1 when the status was notbroadcasting, that UE (100) will send SI request at time instance t1+T<N assuming acquired SIB1 is valid. There is no problem with this because the UE (100) after sending the SI request will acquire the concerned SIB from either broadcast or the gNB will deliver the SIB requested by the UE (100) in the dedicated RRC signaling.

This holds true for using stored SIB1 acquired in a modification period for deciding to send SI request in that modification period itself and there is no need to re-acquire SIB1. Therefore, if the UE (100) need a SIB in RRC_CONNECTED at any time during a modification period N, the UE (100) can check SIB1 acquired at the beginning of that modification period N to order to determine SI request transmission. However, with respect to broadcast bit, SIB1 acquired in modification period N is not valid for the SI request in the modification period N+1 i.e., t1+T>N. For example, in modification period N, broadcast bit can be set to broadcasting. In modification period N+1, the broadcast bit is set to notBroadcasting. In the si-schedulingInfo if only broadcast bit is changed in modification period N+1 compared to modification period N, the network (200) will neither send SI change notification nor SIB1 in dedicated manner to the UE (100). The UE (100) cannot use stored SIB1 acquired in modification period N to decide to send SI request because if it follows, the UE (100) will not send SI request as broadcast bit is set to broadcasting in modification period N and hence the UE (100) will fail to acquire required SIB as network is not broadcasting the desired SIB in modification period N+1. In such case the UE (100) shall re-acquire SIB1 from broadcast in modification period N+1 and check broadcast status bit (i.e., at t1+T>N). This is possible for the case where common search space is configured. If common search space is not configured and the UE (100) has not previously acquired SIB1 in modification period N+1, the UE (100) needs to send SI request without checking broadcast status bit based on the stored SIB1 acquired in modification period N (i.e., according to Method 1).

Figure 4:
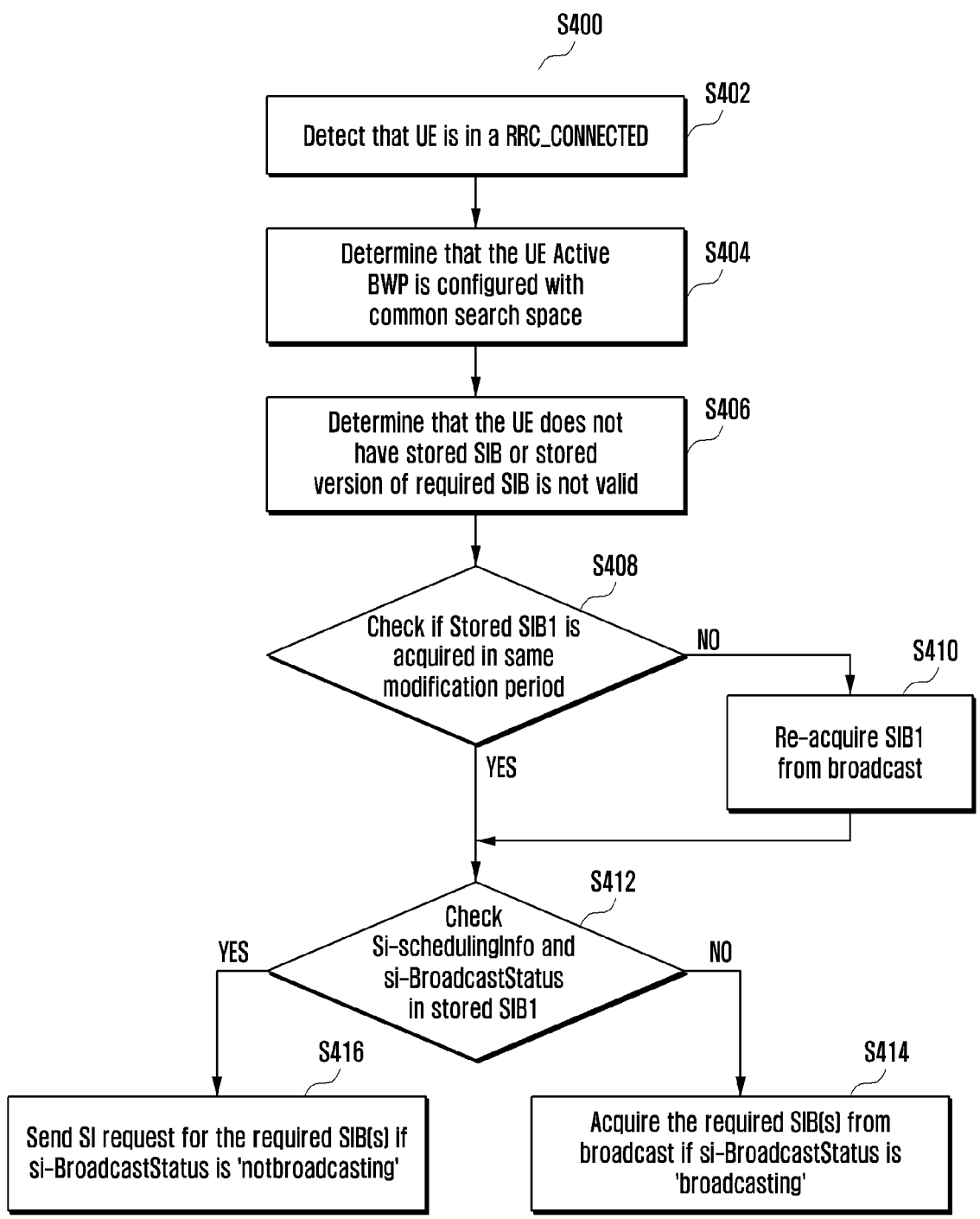

The method can be used to trigger the SI request to acquire SIB in the RRC_CONNECTED state when the UE active BWP is configured with common search space is depicted in the FIG. 4. In an example, as shown in the FIG. 4, at S402, the method includes detecting that the UE (100) is in the RRC connected mode. At S404, the method includes determining that the UE active BWP is configured with common search space. At S406, the method includes determining that the UE (100) does not have stored SIB or stored version of required SIB is not valid. At S408, the method includes checking if the stored SIB1 is acquired in same modification period. If the stored SIB1 is not acquired in same modification period then, at S410, the method includes re-acquiring the SIB1 from broadcast. If the stored SIB1 is acquired in same modification period then, at S412, the method includes checking the Si-schedulingInfo and si-BroadcastStatus in stored SIB1. At S414, the method includes acquiring the required SIBs from broadcast if si-BroadcastStatus is 'broadcasting'. At S416, the method includes sending the SI request for the required SIB(s) if si-BroadcastStatus is 'notbroadcasting'.

The following updates needs to be introduced in clause 5.2.2.3.1 in Release 16 version of RRC specification to allow the UE (100) to re-acquire SIB1 when the UE's active BWP is configured with common search space and the UE (100) need to check the status of broadcast bit in modification period N+1 if the stored SIB1 is acquired in modification N or earlier.

5.2.2.3.1 Acquisition of MIB and SIB1

The UE (100) shall:
1>apply the specified BCCH configuration defined in 9.1.1.1;
1>if the UE (100) is in the RRC IDLE or in the RRC INACTIVE; or
1>if the UE (100) is in the RRC_CONNECTED while T311 is running:
2>acquire the MIB, which is scheduled as specified in TS 38.213;
2>if the UE (100) is unable to acquire the MIB;
3>perform the actions as specified in clause 5.2.2.5;
2>else:
3>perform the actions specified in clause 5.2.2.4.1.
1>if the UE (100) is in the RRC_CONNECTED with an active BWP with common search space configured by the searchSpaceSIB1 and pagingSearchSpace and has received an indication about change of system information; or
1>if the UE (100) is in the RRC_CONNECTED with the active BWP with common search space configured by searchSpaceSIB1 and pagingSearchSpace and the UE (100) need to check si-BroadcastStatus in modification period N+1 wherein stored SIB1 is acquired in modification period N or earlier; or
1>if the UE (100) is in the RRC IDLE or in the RRC INACTIVE; or
1>if the UE (100) is in the RRC_CONNECTED while T311 is running:
2>if ssb-SubcarrierOffset indicates SIB1 is transmitted in the cell (TS 38.213) and if SIB1 acquisition is required for the UE:
3>acquire the SIB1, which is scheduled as specified in TS 38.213;
3>if the UE (100) is unable to acquire the SIB1:
4>perform the actions as specified in clause 5.2.2.5;
3>else:
4>upon acquiring SIB1, perform the actions specified in clause 5.2.2.4.2.
2>else if SIB1 acquisition is required for the UE (100) and ssb-SubcarrierOffset indicates that SIB1 is not scheduled in the cell:
3>perform the actions as specified in clause 5.2.2.5.

Alternately, the UE (100) shall:
1>apply the specified BCCH configuration defined in 9.1.1.1;
1>if the UE (100) is in the RRC IDLE or in the RRC INACTIVE state; or
1>if the UE (100) is in the RRC_CONNECTED while T311 is running:
2>acquire the MIB, which is scheduled as specified in TS 38.213;
2>if the UE (100) is unable to acquire the MIB;
3>perform the actions as specified in clause 5.2.2.5;
2>else:
3>perform the actions specified in clause 5.2.2.4.1.
1>if the UE (100) is in RRC_CONNECTED with the active BWP with common search space configured by searchSpaceSIB1 and pagingSearchSpace and has received an indication about change of system information; or
1>if the UE (100) is in the RRC_CONNECTED with the active BWP with common search space configured by searchSpaceSIB1 and pagingSearchSpace and the UE (100) has not stored a valid version of the SIB, in accordance with sub-clause 5.2.2.2.1, of one or several required SIB(s), in accordance with sub-clause 5.2.2.1 and UE (100) has not acquired SIB1 in current modification period; or
1>if the UE (100) is in the RRC IDLE or in the RRC INACTIVE; or
1>if the UE (100) is in the RRC_CONNECTED while T311 is running:
2>if ssb-SubcarrierOffset indicates SIB1 is transmitted in the cell (TS 38.213) and if SIB1 acquisition is required for the UE (100):
3>acquire the SIB1, which is scheduled as specified in TS 38.213;
3>if the UE (100) is unable to acquire the SIB1:
4>perform the actions as specified in clause 5.2.2.5;
3>else:
4>upon acquiring SIB1, perform the actions specified in clause 5.2.2.4.2.
2>else if SIB1 acquisition is required for the UE (100) and ssb-SubcarrierOffset indicates that SIB1 is not scheduled in the cell:
3>perform the actions as specified in clause 5.2.2.5.

Alternately, the UE (100) shall:
1>apply the specified BCCH configuration defined in 9.1.1.1;
1>if the UE (100) is in the RRC IDLE or in the RRC INACTIVE; or
1>if the UE (100) is in the RRC_CONNECTED while T311 is running:
2>acquire the MIB, which is scheduled as specified in TS 38.213;
2>if the UE (100) is unable to acquire the MIB;
3>perform the actions as specified in clause 5.2.2.5;
2>else:
3>perform the actions specified in clause 5.2.2.4.1.
1>if the UE (100) is in the RRC_CONNECTED with an active BWP with common search space configured by searchSpaceSIB1 and pagingSearchSpace and has received an indication about change of system information; or
1>if the UE (100) is in the RRC_CONNECTED with the active BWP with the common search space configured by searchSpaceSIB1 and pagingSearchSpace and onDemandSibRequest is set to TRUE and the UE (100) has not stored the valid version of the SIB, in accordance with sub-clause 5.2.2.2.1, of one or several required SIB(s), in accordance with sub-clause 5.2.2.1 and the UE (100) has not acquired SIB1 in current modification period; or
1>if the UE (100) is in the RRC IDLE or in the RRC INACTIVE; or
1>if the UE (100) is in the RRC_CONNECTED while T311 is running:
2>if ssb-SubcarrierOffset indicates the SIB1 is transmitted in the cell (TS 38.213 [13]) and if SIB1 acquisition is required for the UE (100):
3>acquire the SIB1, which is scheduled as specified in TS 38.213;
3>if the UE (100) is unable to acquire the SIB1:
4>perform the actions as specified in clause 5.2.2.5;
3>else:
4>upon acquiring SIB1, perform the actions specified in clause 5.2.2.4.2.
2>else if SIB1 acquisition is required for the UE and ssb-SubcarrierOffset indicates that SIB1 is not scheduled in the cell:

3>perform the actions as specified in clause 5.2.2.5.

Alternately, the clause 5.2.2.3.3x actions upon the need to acquire SIB in the CONNECTED state, can be updated as follows:

The UE (100) shall:
1>if the UE (100) is in the RRC_CONNECTED with the active BWP with common search space not configured by the searchSpaceSIB1 and pagingSearchSpace and the UE (100) has not stored the valid version of the SIB, in accordance with sub-clause 5.2.2.2.1, of one or several required SIB(s), in accordance with sub-clause 5.2.2.1:
2>for the SI message(s) that, according to the si-SchedulingInfo in the stored SIB1, contain at least one required SIB:
3>trigger a request to acquire the SI message(s) as defined in sub-clause 5.2.2.3.3:
1>else if the UE (100) is in the RRC_CONNECTED with the active BWP with the common search space configured by searchSpaceSIB1 and pagingSearchSpace and the UE (100) has not stored the valid version of the SIB, in accordance with sub-clause 5.2.2.2.1, of one or several required SIB(s), in accordance with sub-clause 5.2.2.1:
2>if stored SIB1 is acquired in current modification period:
3>for the SI message(s) that, according to the si-SchedulingInfo in the stored SIB1, contain at least one required SIB and for which si-BroadcastStatus is set to Broadcasting:
4>acquire the SI message(s) as defined in sub-clause 5.2.2.3.2;
3>for the SI message(s) that, according to the si-SchedulingInfo in the stored SIB1, contain at least one required SIB and for which si-BroadcastStatus is set to notBroadcasting:
4>trigger a request to acquire the SI message(s) as defined in sub-clause 5.2.2.3.3:
2>else:
3>acquire SIB1;

Alternately, the clause 5.2.2.3.3x, actions upon the need to acquire SIB in CONNECTED state, can be updated as follows The UE (100) shall:
1>if the UE (100) is in the RRC_CONNECTED with the active BWP with common search space not configured by the searchSpaceSIB1 and pagingSearchSpace and onDemandSibRequest is set to TRUE and the UE (100) has not stored the valid version of the SIB, in accordance with sub-clause 5.2.2.2.1, of one or several required SIB(s), in accordance with sub-clause 5.2.2.1:
2>for the SI message(s) that, according to the si-SchedulingInfo in the stored SIB1, contain at least one required SIB:
3>trigger a request to acquire the SI message(s) as defined in sub-clause 5.2.2.3.3:
1>else if the UE (100) is in the RRC_CONNECTED with the active BWP with common search space configured by the searchSpaceSIB1 and pagingSearchSpace and onDemandSibRequest is set to TRUE and the UE (100) has not stored a valid version of a SIB, in accordance with sub-clause 5.2.2.2.1, of one or several required SIB(s), in accordance with sub-clause 5.2.2.1:
2>if stored SIB1 is acquired in current modification period:
3>for the SI message(s) that, according to the si-SchedulingInfo in the stored SIB1, contain at least one required SIB and for which si-BroadcastStatus is set to Broadcasting:
4>acquire the SI message(s) as defined in sub-clause 5.2.2.3.2;
3>for the SI message(s) that, according to the si-SchedulingInfo in the stored SIB1, contain at least one required SIB and for which si-BroadcastStatus is set to notBroadcasting:
4>trigger a request to acquire the SI message(s) as defined in sub-clause 5.2.2.3.3:
2>else:
3>acquire SIB1;

Method 3: Status of broadcast bit is notBroadcasting and FLAG in RRCReconfig is FALSE If common search space to receive the system information is configured on the active BWP, the UE (100) is in the RRC_CONNECTED checks whether the required on-demand SI is being broadcasted by reading SIB1 before transmitting the SI request, and transmits the SI request only when the required on-demand SI is not being broadcasted, as in RRC IDLE/INACTIVE. In addition to the broadcast status bit in the SIB1, another explicit network indication (i.e., FLAG) is included RRCReconfiguration message in order to inform the UE (100) whether the on-demand SIB request in the RRC_CONNECTED is supported. The UE behavior when the active BWP is configured with common search space should be clear if the UE (100) receives the FLAG included RRCReconfiguration message and when UE (100) checks the broadcast status bit in SIB1.

The field description of si-BroadcastStatus bit states: "Indicates if the SI message is being broadcasted or not. Change of si-BroadcastStatus should not result in system information change notifications in Short Message transmitted with P-RNTI over DCI (see clause 6.5). The value of the indication is valid until the end of the BCCH modification period when set to broadcasting"

The field description of onDemandSibRequest FLAG included in the RRCReconfiguration states: "Indicates whether the UE (100) is allowed to request SIBs on-demand while in RRC_CONNECTED state" as indicated in [Table 2].

TABLE 2

| Case | si-BroadcastStatus | onDemandSibRequest | UE behavior | Remarks |
| --- | --- | --- | --- | --- |
| Case 1 | Broadcasting | FALSE | Do not send SI request in RRC_Connected | If common search space in UE's active BWP |
| Case 2 | Broadcasting | TRUE | Do not send SI request in | is configured, UE (100) |

TABLE 2-continued

| Case | si-BroadcastStatus | onDemandSibRequest | UE behavior | Remarks |
|---|---|---|---|---|
| | | | RRC Connected | acquires required SIB from broadcast |
| Case 3 | NotBroadcasting | TRUE | Send request in RRC_Connected | If common search space in UE's active BWP is configured, after sending SI request, UE (100) acquires required SIB from broadcast or NW sends in dedicated manner |
| Case 4 | NotBroadcasting | FALSE | Do not send SI request in RRC Connected | In this case UE (100) can neither acquire required SIB from broadcast nor send SI request. NW should perform unsolicited delivery of the required SIB to the UE (100) in dedicated manner |

Figure 5:
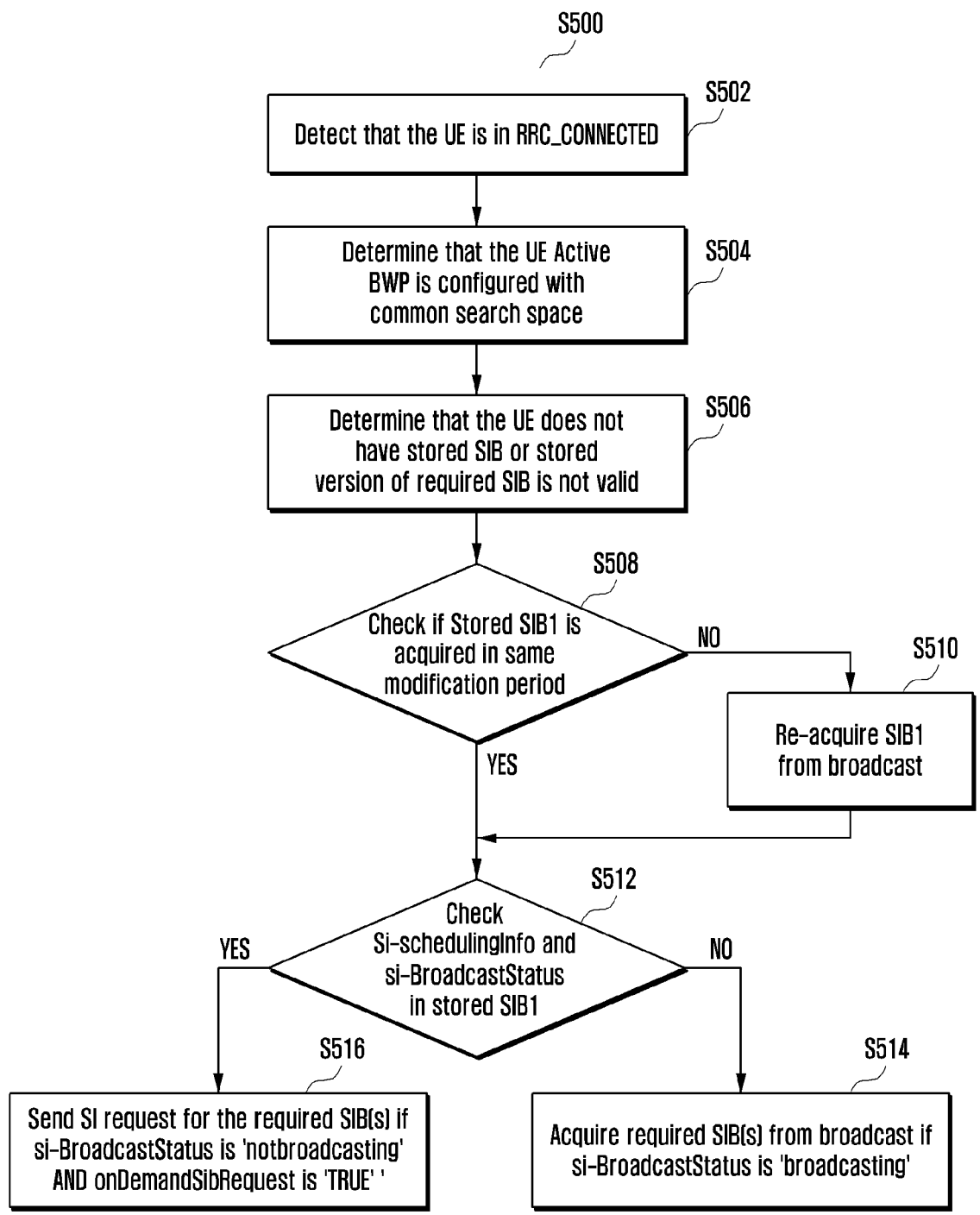

The UE behavior for cases 1, 2 and 3 is shown in the FIG. 5. In an example, as shown in the FIG. 5, at S502, the method includes detecting that the UE (100) is in the RRC connected mode. At S504, the method includes determining that the UE active BWP is configured with common search space. At S506, the method includes determining that the UE (100) does not have stored SIB or stored version of required SIB is not valid. At S508, the method includes checking if the stored SIB1 is acquired in same modification period. If the stored SIB1 is not acquired in same modification period then, at S510, the method includes re-acquiring the SIB1 from broadcast. If the stored SIB1 is acquired in same modification period then, at S512, the method includes check Si-schedulingInfo and si-BroadcastStatus in stored SIB1. At S514, the method includes acquiring the required SIB(s) from broadcast if si-BroadcastStatus is 'broadcasting'. At S516, the method includes sending the SI request for the required SIB(s) if si-BroadcastStatus is 'notbroadcasting' AND onDemandSibRequest is 'TRUE".

Figure 6:
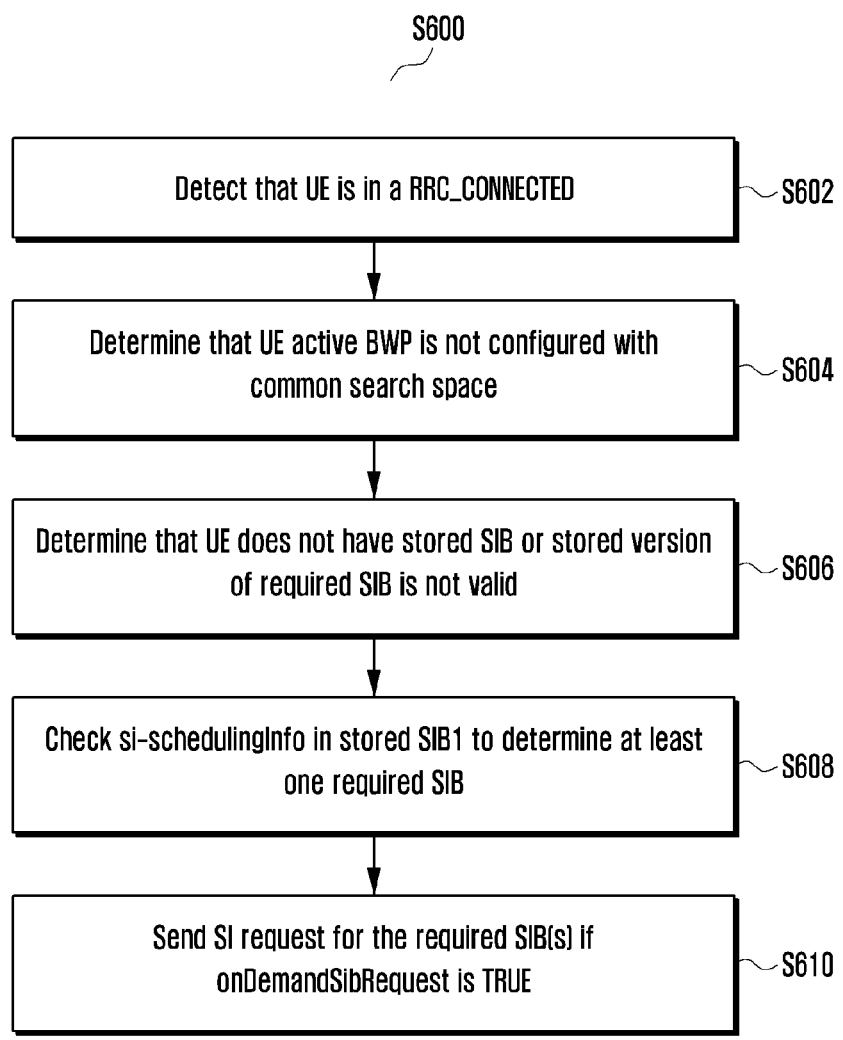
FIG. 6 is a flow diagram illustrating that the UE sends a SI request, if onDemandSibRequest FLAG included in RRCReconfiguration message is set as TRUE for the case when an active BWP is not configured with common search space, according to embodiments as disclosed herein.

For the case when active BWP is not configured with common search space, the UE (100) sends the SI request according to method 1 if onDemandSibRequest FLAG included in RRCReconfiguration message is set as TRUE as depicted in the FIG. 6. As shown in the FIG. 6, at 602, the method includes detecting that the UE (100) is in the RRC connected mode. At 604, the method includes determining that UE active BWP is not configured with common search space. At 606, the method includes determining that the UE (100) does not have stored SIB or stored version of required SIB is not valid. At 608, the method includes checking si-schedulingInfo in stored SIB1 to determine at least one required SIB. At 610, the method includes sending the SI request for the required SIB(s) if the onDemandSibRequest is TRUE.

The various actions, acts, blocks, steps, or the like in the flow diagrams (S200-S600) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
in case that the UE is in a radio resource control (RRC) connected state with an active bandwidth part (BWP) configured with a common search space for a system information block 1 (SIB1), the UE has not stored a valid version of a system information block (SIB) of one or more required SIBs, and the UE has not acquired the SIB1 in a current modification period, acquiring, from a base station, the SIB1 comprising scheduling information associated with system information (SI);
receiving, from the base station, an RRC reconfiguration message, wherein the RRC reconfiguration message includes an onDemandSibRequest indicator indicating that the UE is allowed to request at least one SIB on-demand while in the RRC connected state;
identifying whether the UE is in the RRC connected state with an active bandwidth part (BWP) configured with a common search space for other system information and whether the UE has stored the valid version of the SIB of the one or more required SIBs; and
in case that the UE is in the RRC connected state with the active BWP not configured with the common search space for the other system information and the UE has not stored the valid version of the SIB of the one or more required SIBs, transmitting, to the base station, a request message to request at least one required SIB based on the onDemandSibRequest indicator.

2. The method of claim 1, further comprising:
storing the acquired SIB1.

3. The method of claim 2, further comprising:
checking the scheduling information in the stored SIB1 to determine the at least one required SIB.

4. The method of claim 1, further comprising:
in case that the UE is in the RRC connected state with the active BWP configured with the common search space for the other system information and the UE has not stored the valid version of the SIB of the one or more required SIBs;
identifying whether a si-BroadcastStatus indicator included in the scheduling information is set to broadcasting or not-broadcasting; and
acquiring, from the base station, the at least one required SIB, in case that the si-BroadcastStatus indicator is set to broadcasting.

5. The method of claim 4, wherein the transmitting the request message comprises:
transmitting, to the base station, the request message to request the at least one required SIB, in case that the si-BroadcastStatus indicator is set to not-broadcasting.

6. A user equipment (UE) in a wireless communication system, the UE comprising:
a transceiver; and
a processor coupled with the transceiver and configured to:
in case that the UE is in a radio resource control (RRC) connected state with an active bandwidth part (BWP) configured with a common search space for a system information block 1 (SIB1), the UE has not stored a valid version of a system information block (SIB) of one or more required SIBs, and the UE has not acquired the SIB1 in a current modification period, acquire, from a base station, the SIB1 comprising scheduling information associated with system information (SI),
receive, from the base station, an RRC reconfiguration message, wherein the RRC reconfiguration message includes including an onDemandSibRequest indicator indicating that the UE is allowed to request at least one SIB on-demand while in the RRC connected state,
identify whether the UE is in the RRC connected state with an active bandwidth part (BWP) configured with a common search space for other system information and whether the UE has stored the valid version of the SIB of the one or more required SIBs, and
in case that the UE is in the RRC connected state with the active BWP not configured with the common search space for the other system information and the UE has not stored the valid version of the SIB of the one or more required SIBs, transmit, to the base station, a request message to request at least one required SIB based on the onDemandSibRequest indicator.

7. The UE of claim 6, wherein the processor is further configured to:
store the acquired SIB1.

8. The UE of claim 7, wherein the processor is further configured to:
check the scheduling information in the stored SIB1 to determine the at least one required SIB.

9. The UE of claim 6, wherein the processor further configured to:
in case that the UE is in the RRC connected state with the active BWP configured with the common search space for the other system information and the UE has not stored the valid version of SIB of the one or more required SIBs,
identify whether a si-BroadcastStatus indicator included in the scheduling information is set to broadcasting or not-broadcasting, and
acquire, from the base station, the at least one required SIB, in case that the si-BroadcastStatus indicator is set to be broadcasting.

10. The UE of claim 9, wherein the processor is further configured to:
transmit, to the base station, the request message to at least one required SIB, in case that the si-BroadcastStatus indicator is set to be not-broadcasting.

* * * * *